United States Patent [19]
Busby

[11] Patent Number: 4,903,174
[45] Date of Patent: Feb. 20, 1990

[54] VEHICLE EMERGENCY LIGHT KIT

[76] Inventor: Edward Busby, 2115 Villeneuve St., Apt. No. 5, Longueuil, Quebec J4J 3A9, Canada

[21] Appl. No.: 349,036

[22] Filed: May 9, 1989

[51] Int. Cl.⁴ .............................................. B60Q 1/26
[52] U.S. Cl. ..................................... 362/61; 362/251; 362/397; 340/431; 340/468
[58] Field of Search ..................... 362/61, 80, 85, 212, 362/226, 250, 251, 295, 394, 397; 340/468, 473, 475, 479, 431

[56]  References Cited
U.S. PATENT DOCUMENTS

| | | | |
|---|---|---|---|
| 2,667,569 | 1/1954 | Lethcoe | 362/253 |
| 2,905,925 | 9/1959 | Whiteneck | 362/397 X |
| 3,278,741 | 9/1964 | Wood | 362/80 |
| 3,691,366 | 9/1972 | Spreuer | 362/253 |
| 3,800,430 | 4/1974 | Samra | 362/61 X |
| 4,091,442 | 5/1978 | Markey | 362/61 |
| 4,286,309 | 8/1981 | Rasinski | 362/61 |

FOREIGN PATENT DOCUMENTS 1060863  8/1979  Canada .

Primary Examiner—Stephen F. Husar
Attorney, Agent, or Firm—Larson and Taylor

[57] ABSTRACT

An emergency rear light kit for temporary installation on the back of a vehicle or trailer provides lights for a vehicle when the vehicle lights fail. The kit has two rear light units that can be easily mounted on the back of a vehicle or trailer, a control box with manual switches to operate indicator, brake and tail lights. An extension cable with plug and socket is provided to suit all lengths of vehicle and trailer.

7 Claims, 3 Drawing Sheets

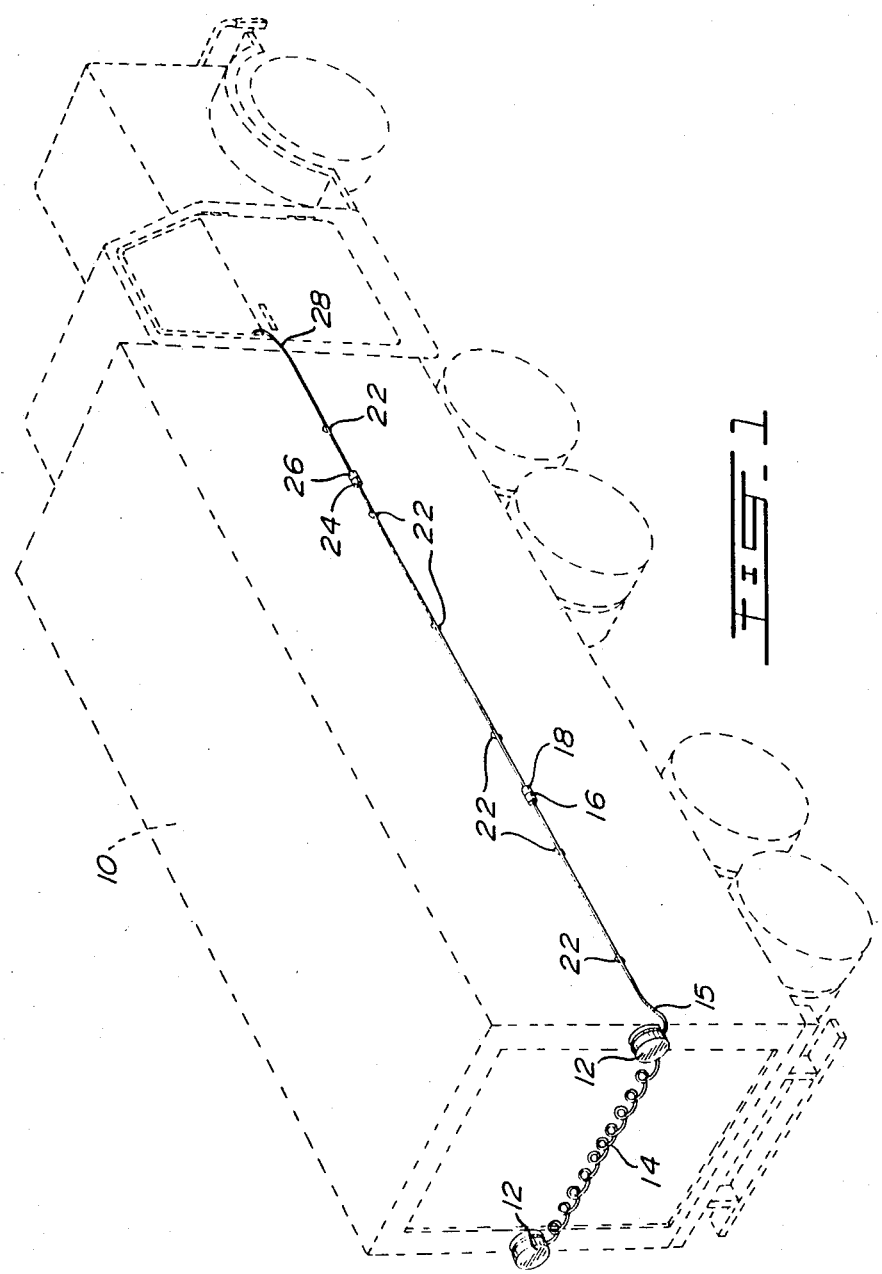

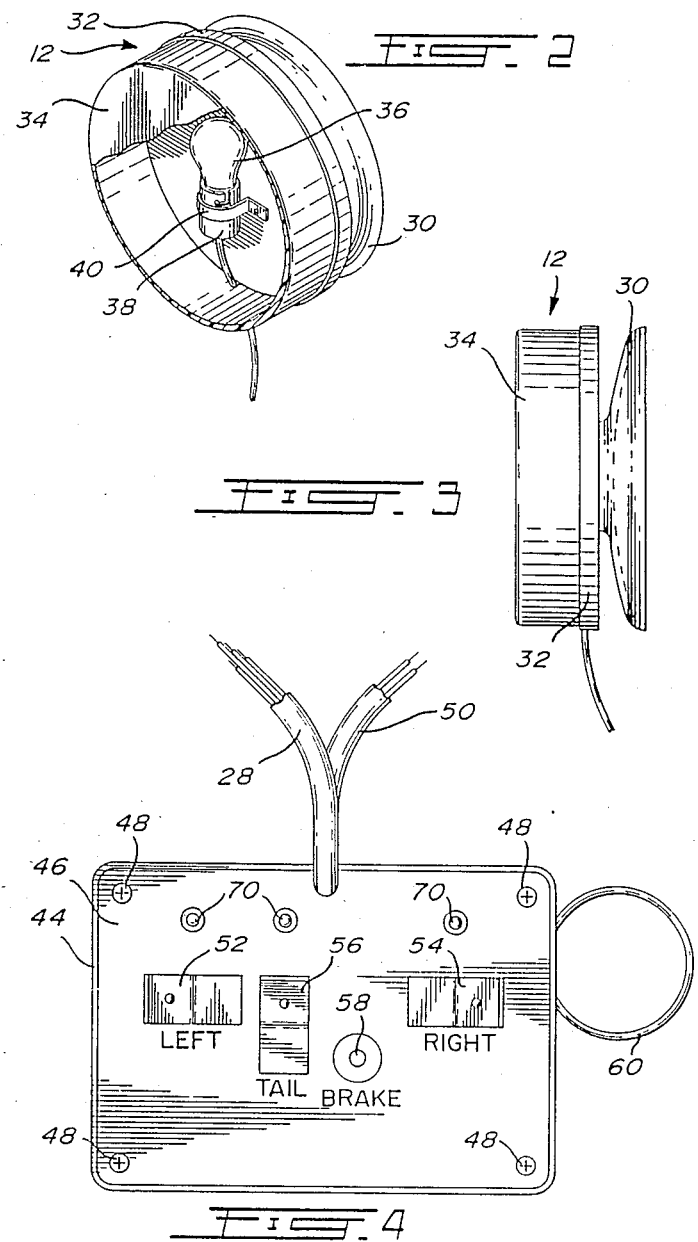

VEHICLE EMERGENCY LIGHT KIT

The present invention relates to an emergency rear light kit for temporary installation at the back of a vehicle or trailer. More specifically the present invention provides an emergency light kit having a control box which can be positioned beside the driver of a vehicle and has leads to emergency lights that can be temporarily mounted on the back of a vehicle or a trailer.

In cars and trucks, either towing trailers or not towing trailers, there can from time to time occur a failure in either one or more of the rear lights which can result in the vehicle driving unlawfully on the roads. This situation often occurs on tractor trailer combinations, thus an emergency light kit that can be carried in the cab of a tractor or inside a car and is adapted for use of all vehicles becomes a useful requirement. The unit may be used when tail lights, brake lights or indicator lights burn out or when wiring inside a vehicle or trailer fails.

The present invention aims to provide an emergency light kit suitable for all road vehicles whether it be cars, trucks, tractor trailers or vehicles towing a separate trailer. The kit provides at least two rear lights that can easily be temporarily mounted at the back of a vehicle or trailer. The rear lights have a multi lead cable which is connected by a plug and socket connection, either through an extension cord or not as required, to a control box that is placed in the cab of a tractor or at a location that can be easily reached by the driver of a car or truck. The control box has a power lead with a plug for insertion in a standard cigarette lighter socket on the panel of a vehicle. In the case of a trailer, the plug connection in the cable between the control box and the lights may be used for connection to a standard electrical trailer connecting socket on a vehicle, thus making the rear lights operate with the regular vehicle lighting system.

The control box in the present kit has positive switches for indicator lights and tail lights together with a momentary switch for a brake light. Thus running or tail lights may be left on continuously and the turning indicator lights can be operated by a driver before a turn. Furthermore, the brake lights can also be operated by a driver by simply pushing n a momentary switch which applies the brake lights only when the switch is pushed. Furthermore, by switching on both left and right indicator light switches at the same time, flashing lights occur in both rear lights for emergency purposes.

The present invention provides an emergency light kit for a vehicle comprising: at least two rear light units with attachment means to temporarily attach the units to the back of a vehicle or trailer, each rear light unit having a tail light element, and a direction indicator and brake light element; control box for positioning beside a vehicle driver, the control box having a power lead with a plug for insertion in a standard cigarette lighter socket, first electrical circuit for direction indicator lights with a flasher therein and positive switches for left and right indication, second electrical circuit for tail lights with a positive switch therein, and third electrical circuit for brake lights with a momentary switch therein, and electrical multi lead cable for all circuits between the control box and the rear light units having at least one combined cable plug and socket connection therein.

In other embodiments, an electrical coiled expansion cable is provided for leads between the two rear light units thus permitting the units to be spaced apart as required for a particular vehicle or trailer. The attachment means to temporarily attach the two rear light units to the back of a vehicle or trailer are preferably suction cups. Extension cables may be provided for insertion between the plug and socket connection of the electrical multi lead cable, the extension cable may be of different lengths for varying sizes of vehicles. Removable clips may be provided to hold the electrical multi lead cable and extension cables to one side and the back of a vehicle or trailer. In a further embodiment, panel lights are provided on the control box to indicate when the electrical circuits are activated.

In drawings which illustrate embodiments of the invention:

FIG. 1 is an isometric view of a tractor trailer having an emergency light kit according to one embodiment the present invention mounted thereon;

FIG. 2 is an isometric view partly in section of one embodiment showing a rear light unit;

FIG. 3 is a side view of the rear light unit shown in FIG. 2;

FIG. 4 is a top view of a control box for the emergency light kit.

Figure 5:
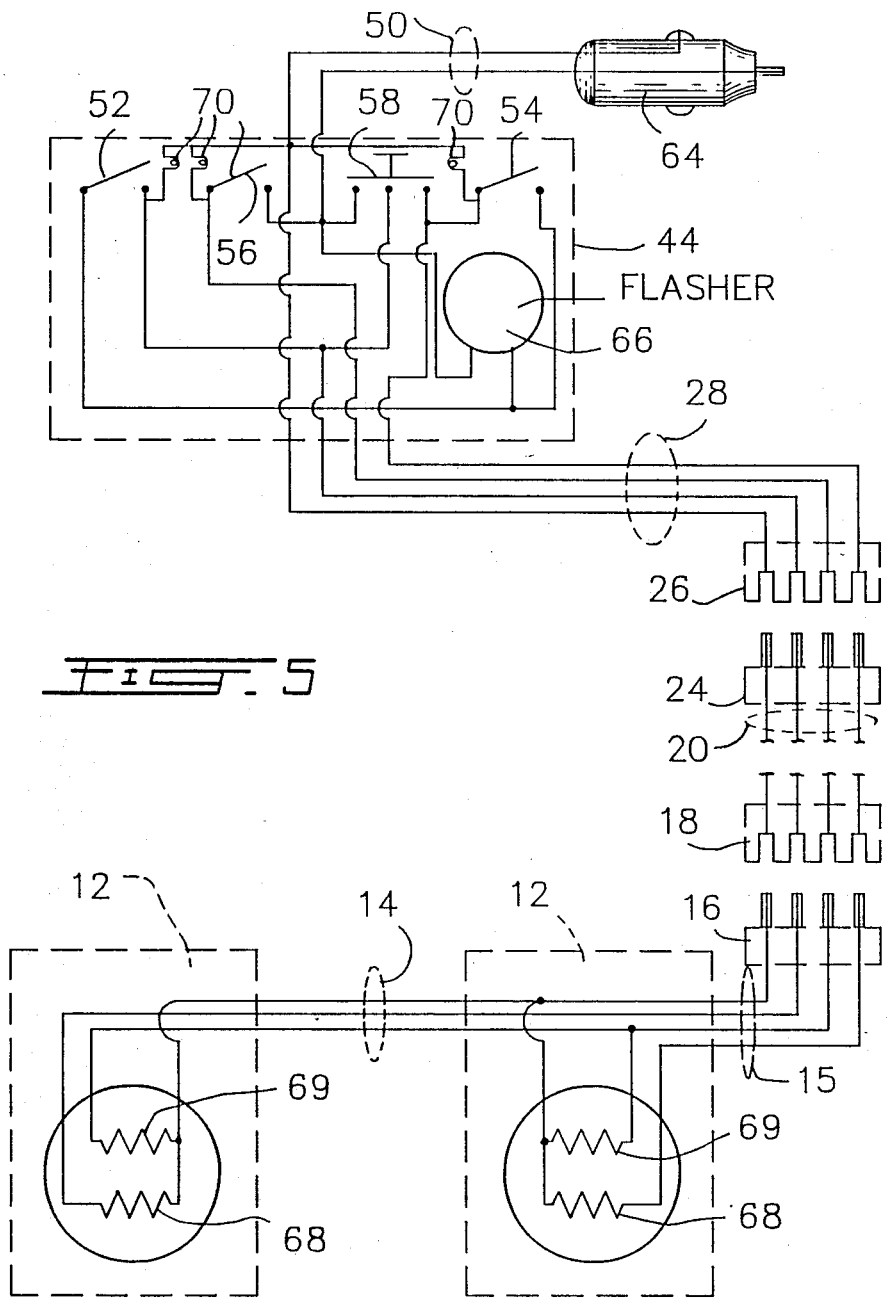
FIG. 5 is a wiring diagram for one embodiment of the emergency light kit of the present invention.

The emergency light kit of the present invention comprises primarily two elements with an optional extension cable. The first element is a control box for locating beside a driver's position of a vehicle, power leads and plug to fit in a standard cigarette lighter socket and a multi lead cable ending in a socket. The second element comprises two rear light units with a multi lead cable joining the light units together and a multi lead cable ending in a plug to fit in the socket from the control box. An extension cable with plug and socket may be provided to fit between the plug from the light units and the socket from the control box. FIG. 1 illustrates a tractor trailer arrangement 10 with two rear light units 12 having an electrical multi lead coiled expansion cable 14 extending between the light units 12. The coiled expansion cable 14 allows a variation in distance between the two rear light units 12 and prevents the cable 14 from sagging if the distance is short, thus the light units may be mounted on the back of almost any width of vehicle or trailer. A multi lead cable 15 from the right hand rear light unit 12 extends to a plug 16 which joins to a socket 18 of an extension cable 20. In one embodiment, the cable 15 is fifteen feet long. As can be seen in FIG. 1, tie down clips 22, preferably metal spring clips with a soft rubber pad on one side to protect the paint surface of a vehicle or plastic flexible tie clips are used to attach the extension cable 20 to the right hand side of the trailer unit. The extension cable 20 has a plug 24 at the cab end which connects to a socket 26 joined to a multi lead cable 28 passing through the side window of the tractor for connection to the control box in the cab. For purposes of illustration, the plug 24 and socket 26 are shown outside the cab. In effect, the multi lead cable 28 is preferably only a foot long and, therefore, the plug 24 and socket 26 are inside the cab.

The rear light units 12 are illustrated in more detail in FIGS. 2 and 3 and each have a rubber suction cup 30 attached to a back plate 32 which has a red plastic transparent cover 34 thereon. A two element bulb 36 fits into socket 38 held to the back plate 32 by clip 40. The suction cups 30 in one embodiment are approximately three inches in diameter and for holding on painted steel or painted aluminum, the sides of the cup are be swabbed lightly with an aerosol lubricant such as that sold under the trade mark WD40 before being pressed onto the surface. In the case of a plastic or glass surface, the cups 30 are moistened with water and then pushed onto the surface. In some instances, the suction cups 30 come with a pull tab for easy release. Whereas two rear light units are illustrated, four or more light units may be used to form the second element with multi lead cables, either coiled cables or flexible cables. The two element bulb 36 is a standard twelve volt vehicle bulb, so if one burns out, one of the vehicle or trailer bulbs from the vehicle or trailer light units will probably fit into the rear light unit 12 of emergency light kit.

The control box 44 as illustrated in FIG. 4 has a top panel 46 attached to the box by four screws 48. Two sets of electrical leads, the light leads 28 and power leads 50 to a cigarette lighter plug described hereafter extend through an opening in the top panel 46 so that ease of maintenance is obtained. It is merely necessary to remove the panel 46 by undoing the four screws 48 to check the wiring within the control box 44.

A left hand indicator switch 52 and a right hand indicator switch 54 are both positive switches and located on the left hand side and the right hand side of the panel 44. By pressing the left hand switch 52, a flashing indicator light occurs in the left hand rear light unit by pressing the right hand switch 54, a flashing indicator light occurs in the right hand rear light unit. By pressing both left hand and right hand switches 52 and 54, both rear light units 12 flash. A tail light switch 56 is used to turn on the tail lights, in both rear light units. The tail light is sometimes referred to as the parking light or running light. The tail light switch 56 is also a positive switch so that it can be pressed on and remains on until the operator turns it off. A momentary switch 58 which is spring loaded is provided for the brake light and an operator must press the switch downwards in order for the brake light on the two rear light units 12 to operate. By removing his finger from the brake light switch 58, the brake lights are turned off. A plastic holder 60 is provided on the side of the control panel 44 to hold a cigarette lighter when it is removed from the socket.

Panel indicator lights 70 are provided to indicate the particular function of the switches. The panel indicator lights 70 operate in exactly the same way as the rear light units to give an indication to an operator.

The wiring diagram for the control box and rear light units 12 is illustrated in FIG. 5. The power leads 50 connect to a plug 64 for insertion in a standard cigarette lighter socket of a vehicle. There are three main electrical circuits for the lighting system, the first circuit links the left hand indicator switch 52 and right hand indicator switch 54 through a flasher unit 66 to high power elements 68 in the left hand and right hand rear light units 12. As stated when both switches 52 and 54 are closed, then both light elements 68 flash. The second circuit is the tail light circuit operated by the tail light switch 56 and by closing this switch the two low power elements 69 in the rear light units 12 are switched on. The brake light circuit is operated by the momentary brake light switch 58 which lights both high power elements 68 in the two light units 12. The high power elements 68 produce a brighter light than the low power elements 69. The panel lights 70 indicate when the low power elements 69 are lit and when the high power elements 68 are lit.

Installation of the kit is comparatively simple by positioning the control box at a convenient location beside the driver, preferably on the dash board removing the cigarette lighter and placing it in the holder 60 attached to the control box and inserting the plug 64 from the control box into the cigarette lighter socket of the vehicle. The two rear light units 12 are mounted at the back of the vehicle or trailer, the plug 18 on the extension cable 20 is connected up to the socket 16 on the cable 15 to the light units 12 and the plug 24 on the extension cable 20 is plugged into the socket 26 on the cable 28 to the control box. The extension cable 20 is attached to the vehicle by clips or other means, extra or left over cable is looped and clipped to the trailer or vehicle, and the kit is then in operation. The driver has manual control over rear indicator lights, brake lights and tail lights.

If the trailer is made from wood and has no suitable surface for mounting the suction cups 30 on the lights units, then a suitably sized sheet metal plate can be used with wood screws or other suitable connection, to provide a surface for the suction cups.

The wiring diagram illustrates the multi lead cables between the control box and the light units running down the right hand side of a vehicle. If it is required to run the cables down the left hand side of a vehicle, then the wiring for the left hand switch 52 and right hand switch 54 may be interchanged or, alternatively, the control box may be turned around so the opening for the cable 28 and leads 50 is at the bottom rather than the top of the box.

The electrical leads are preferably color coded and standard color coding is used. Furthermore, the plugs and sockets are preferably the standard units used for trailer connections, thus for emergency purposes, the two rear light units 12 may have their plug 16 connected to a socket from a standard trailer hitch so that the rear lights operate from the normal vehicle lights. In this instance it is not necessary to use the control box. Extension cables may be provided in different lengths 10, 20, 30 and 50 feet lengths are available.

Various changes may be made to the embodiments described herein without departing from the scope of the present invention which is limited only by the following claims.

The embodiments of the invention in which an exclusive property or privilege is claimed are defined as follows.

1. An emergency light kit for a vehicle comprising:
   at least two rear light units with attachment means to temporarily attach the units to the back of a vehicle or trailer, each rear light unit having a tail light element, and a direction indicator and brake light element;
   control box for positioning beside a vehicle driver, the control box having a power lead with a plug for insertion in a standard cigarette lighter socket, first electrical circuit for direction indicator lights with a flasher therein and positive switches for left and right indication, second electrical circuit for tail lights with a positive switch therein, and third electrical circuit for brake lights with a momentary switch therein, and
   electrical multi lead cable for all circuits between the control box and the rear light units having at least one combined cable plug and socket connection therein.

2. The emergency light unit according to claim 1 including an electrical coiled expansion cable for leads between the two rear light units.

3. The emergency light unit according to claim 1 wherein the attachment means to temporarily attach the two rear light units to the back of a vehicle or trailer comprise suction cups.

4. The emergency light kit according to claim 1 including an extension cable with a plug at one end and a socket at the other end to fit between the plug and socket connection in the electrical multi lead cable between the control box and rear light units.

5. The emergency light kit according to claim 1 wherein the control box has a holder for a vehicle cigarette lighter.

6. The emergency light kit according to claim 4 including a plurality of removable clips to hold the electrical multi lead cable and the extension cable to one side and the back of a vehicle or trailer.

7. The emergency light kit according to claim 1 including panel lights on the control box adjacent the positive switches for left and right indication and the positive switch for tail lights, the panel lights operate when the electrical circuits are activated.

* * * * *